United States Patent [19]

Bächler et al.

[11] Patent Number: 4,720,390

[45] Date of Patent: Jan. 19, 1988

[54] PREPARATION OF GELLED FOOD PRODUCTS

[75] Inventors: Robert Bächler, Corsier-sur-Vevey, Switzerland; Pierre-Yves Fosseux, Saint-Lo, France; Rolf Jost, La Tour-de-Peilz, Switzerland

[73] Assignee: Nestec S.A., Vevey, Switzerland

[21] Appl. No.: 836,312

[22] Filed: Mar. 5, 1986

[30] Foreign Application Priority Data

Mar. 19, 1985 [CH] Switzerland ............................ 1209/85

[51] Int. Cl.$^4$ ...................... A23C 21/04; A23C 21/06
[52] U.S. Cl. ....................................... 426/573; 426/583; 426/602; 426/589; 426/646; 426/549; 426/613
[58] Field of Search ................ 426/613, 583, 573, 589, 426/602, 605, 582, 549, 646

[56] References Cited

U.S. PATENT DOCUMENTS

| | | | |
|---|---|---|---|
| 3,892,873 | 7/1975 | Kolen et al. | 426/602 |
| 4,251,562 | 2/1981 | Le Grand | 426/583 |
| 4,515,825 | 5/1985 | Moran et al. | 426/583 |
| 4,552,774 | 11/1985 | Gronfor | 426/583 |

FOREIGN PATENT DOCUMENTS 0052899 6/1982 European Pat. Off. .

*Primary Examiner*—Jeanette Hunter
*Attorney, Agent, or Firm*—Vogt & O'Donnell

[57] ABSTRACT

To prepare thermally gelled emulsions without having to add thickeners or to add calcium, an aqueous medium containing gellable whey proteins is homogenized with a lipidic medium under intensive conditions, after which the emulsion is heat-treated.

The process may be used for preparing, for example, egg custards, omelettes, pancakes, quiches, sausages, jellies, desserts and spreadable creams having excellent organoleptic properties.

24 Claims, No Drawings

PREPARATION OF GELLED FOOD PRODUCTS

This invention relates to the preparation of gelled food products.

Gel-like consistency may be obtained by the action of a thickening agent on an aqueous medium. Gelling may occur: by simple dissolution in the aqueous medium of, for example, gums or pectins; by dissolution in the aqueous medium of, for example, starches, starch derivatives, egg or an egg fraction, followed by cooking; by hot dissolution in the aqueous medium of, for example, a gelatin and cooling of the solution. Starch, gums, pectins and gelatins have a strong thickening power, but no emulsifying properties. By contrast, egg proteins show both the emulsifying properties and the thickening properties required for preparing gelled emulsions. However, these properties only exist when the eggs are fresh. Also, fresh eggs, in addition to their high cost, have to be used rapidly and handled delicately because of risks of contamination.

Efforts have been made at least partly to replace eggs in their culinary applications, particularly in those which involve the use of fresh eggs, but which do not comprise subsequent gelling by cooking, for example in the preparation of oil-in-water emulsions of the mayonnaise and salad dressing type, by proteins of lactic origin, for example whey proteins.

U.S. Pat. No. 3,892,873 for example describes the preparation of salad dressings and mayonnaises incorporating whey proteins which have been partly thermally denaturated and which are intended to act as an emulsifier and thickener instead of egg yellow. In these emulsions, the oil makes up from 50 to 80% by weight, this high proportion being necessary to obtain the desired consistency.

There are other known applications for whey proteins in emulsified systems. Published European Patent Application No. 52,899, for example, describes the incorporation of a concentrate of whey proteins in the aqueous phase of spreadable low-fat creams in the form of water-in-oil emulsions. Their preparation involves a phase reversal which is difficult to control. In this case, the function of the proteins is to improve the mouthfeel, although they do not contribute to gelling so that thickening additives have to be used.

In addition, according to L. Razanajatovo, C. Alais and R. Paul, Le Lait 578, 483–495 (1978) and 581–582, 34–45 (1979) for example, the formation of gels by the action of heat from dispersions of sweet whey proteins necessitates the presence of sucrose (578, p. 488), temperatures above 100° C. (578, p. 490) and available calcium (581–582, p. 43).

Finally, whey proteins are commercially available in the dry state. Although they have an acceptable microbiological quality, their wholesomeness is generally obtained by a heat treatment during which they lose their capacity for gelling.

It has now been found that the known emulsifying and gelling properties on cooking of whey proteins can be utilized for preparing, under certain emulsification conditions, thermally gelled oil-in-water emulsions of acceptable microbiological quality without having to use thickening and/or emulsifying additives and without any need to add calcium.

The present invention relates to a process for the preparation of a gelled food product, in which an oil-in-water emulsion is prepared from an aqueous medium and a lipidic medium, said emulsion containing from 4 to 12%, expressed as weight by volume, of gellable whey proteins and from 2.5 to 40%, expressed as volume, of lipids, followed by thermal gelling of the emulsion. This process is characterized in that the aqueous medium is homogenized with the lipidic medium under such conditions that the emulsion obtained contains a homogeneous series of fat globules having a diameter of from 140 to 6000 nanometers and a mean diameter of less than 1000 nanometers.

In the context of the invention, gellable whey proteins are understood to be whey proteins which have kept their functional properties in terms of gelling power substantially intact. Their suitability may be verified as follows: their dispersion in a concentration corresponding to 10% by weight in water at a pH value of 6.8 to 7 should produce a firm, self-supporting gel by treatment for 30 minutes at 90° C. In the present specification, the weight of the proteins is expressed as total nitrogen $\times 6.38$.

The proteins may have been isolated from the whey by any gentle method which enables their gellable character as defined above to be preserved, for example in accordance with B. Mirabel and R. Gaudal, 1981, Rev. Laitiere Franc. 400, 77–81 or E. Palmer, 1977, Process Biochem. 13, 242–49.

They are preferably in the form of concentrates obtained by ultrafiltration of sweet whey (for example, after coagulation of the casein with rennet), optionally followed by diafiltration (ultrafiltration with dilution), advantageously containing from 50 to 95% and preferably from 70 to 90% by weight of proteins, based on dry matter.

Compared with a dispersion of the whey protein in water, the oil-in-water emulsions prepared in accordance with the invention have a higher viscosity for the same concentration, thus imparting greater firmness to the gels obtained by heat treatment. Thus, the higher the oil content of the emulsion (for example, above 15% by volume), the lower will be the protein concentration required to obtain a firm gel. The protein concentration preferably corresponds to between 4 and 8.5% by weight/volume.

Although not essential, the aqueous medium may contain, in addition to the proteins, other edible, soluble or dispersible substances, for example, sugars, particularly glucose, fructose, sucrose, lactose, and flavorings, colorants, various mineral salts. In addition, it may contain a preservative, for example, an antimycotic agent, such as potassium sorbate.

The pH of the aqueous medium will determine the pH of the emulsion. The pH may be adjusted before or after emulsification with the lipidic medium. To this end, food-grade acids or bases, for example hydrochloric acid, sulfuric acid, lactic acid, citric acid, or acetic acid or sodium hydroxide, potassium hydroxide, sodium carbonate, potassium carbonate, may be added either to the aqueous medium, optionally containing the other substances mentioned above, or to the emulsion containing this aqueous medium. The pH-value may be in the range of from pH 3.5 to pH 8. Below pH 3.5 and above pH 8, the gels do not form and the emulsions remain liquid despite the heat treatment. In the acid range from pH 3.5 to 4.5, gelling is possible and gives smooth, soft gels. This pH range is particularly suitable for the production of, for example, spreadable creams, mayonnaises and salad dressings. The pH range from 4.5 to 8 is suitable for the preparation of smooth, firm gels. It is preferred for the preparation of, for example, omelettes, scrambled eggs, pancakes, quiches, gelatinized meat emulsions, for example, sausages, egg custards, jellies or desserts.

The lipidic medium may consist of various fats of vegetable or animal origin which should be liquid at the emulsification temperature, i.e., at 40° to 60° C, and which may themselves be in the form of emulsions.

Lipids of animal origin include lard or beef tallow, egg yolk or lipids of lactic origin, for example, cream, butter, butter oil and butter oil fractions. Lipids of vegetable origin include, for example, cocoa butter, its equivalents and substitutes, olive oil, peanut oil, soya oil, sunflower oil, corn oil, safflower oil, grapeseed oil, black currant oil either as such or in hydrogenated form.

If necessary, an antioxidant, for example, butyl hydroxy anisole, butyl hydroxy toluene, α-tocopherol, ascorbyl palmitate, etc, may be added to the aqueous medium or preferably to the lipidic medium, the type and quantity of antioxidant added being determined by the desired method and duration of preservation.

For a constant protein concentration, the viscosity of the emulsions obtained after emulsification increases considerably with the lipid concentration. For example, the apparent dynamic viscosity at 25° C., measured as indicated hereinafter, of emulsions containing 5% by weight/volume of proteins increases from around 3 mPa.s (millipascals×second) for a concentration of 10% by volume of lipids to a value above 50 mPa.s for a concentration of 40% by volume of lipids. Viscosity was measured with a Rheomat-115 ® (Contraves AG) at a rotational speed varying from 0 to 350 r.p.m. and from 0 to 112 r.p.m., respectively, in the case of highly viscous emulsions. The speed gradient covered 5 mins. and the maximum speed was maintained for 5 mins., after which the reading was made.

Thus, the protein and lipid concentrations and the protein-to-lipid ratio will be selected according to the nature, the more or less firm texture and the nutritional properties of the products prepared. For example, in the case of products of the egg custard, jelly, omelette or dessert type, the emulsion will preferably contain from 5 to 8.5% by weight/volume of whey proteins and preferably from 10 to 20% by volume of lipids, the protein-to-lipid ratio by weight/volume preferably being from 0.25:1 to 0.85:1.

In the case of spreadable creams, these values are preferably 4–8%; 20–40% and 0.1:1–0.4:1, respectively.

To prepare the emulsion, the aqueous medium may be mixed with the lipidic medium, for example, in a colloid mill, followed by homogenization at 40° to 60° C. and preferably at around 50° C. in a one-stage or two-stage homogenizer in one or more passes until the emulsion contains a single homogeneous series of fatty globules of which the diameters are within the above-mentioned range, the mean diameter being smaller than 1000 nanometers and preferably from 350 to 800 nanometers. Alternatively, homogenization of the two media may be carried out directly without preliminary mixing in a colloid mill.

The degree of homogeneity obtained will depend upon the type of homogenizer used and upon the homogenization conditions. For instance, at least three passes in a two-stage valve-type laboratory homogenizer, each stage being at a pressure of approximately 18 MPa (megapascals), will produce a firm gel, the fineness of the emulsion increasing with the number of passes. In an industrial machine comprising a single stage at a pressure of approximately 20 MPa and in an industrial machine comprising two stages each at a pressure of 15 MPa, a single pass will be sufficient for ultimately obtaining a firm gel. It is preferred to use higher pressures and a larger number of passes to enable the diameter range to be limited and the mean diameter of the fatty globules to be reduced, corresponding to an increase in the fineness of the emulsion.

To produce a gel, the emulsion obtained may be heat-treated for 5 to 90 minutes at 80° to 250° C. The heat-treatment temperature and time are of course interrelated. Thus, if it is desired to prepare a product of the cream type, a temperature of the order of 90° C. at atmospheric pressure and a treatment time of the order of 15 minutes will be sufficient. To obtain a firmer gel, for example, for preparing an egg custard or a dessert, it is preferred to pour the emulsion into containers which are hermetically sealed, the heat treatment then being carried out in the containers, for example, in an autoclave for 15 to 30 minutes at 115° C. Firm gels may also be prepared by treating the emulsion, for example, at approximately 95° C. for around 45 minutes at atmospheric pressure. Finally, where it is desired to prepare products cooked in a frying pan or in the oven, for example, pancakes, omelettes or quiches, the emulsion may be treated for 5 to 35 minutes at 150° to 250° C.

The homogenized and gelled emulsion may constitute the food product which it is desired to prepare. This is the case, for example, with jellies, salad dressings or spreadable creams.

Alternatively, the homogenized emulsion may be dried by spray-drying or by drying in vacuo, for example, by freeze-drying, without undergoing gelling and the intermediate product thus obtained may be stored pending further use and then be reconstituted in an aqueous medium, for example, water or milk and then heat-treated.

In one preferred method for preparing an intermediate product such as this, the aqueous medium or emulsion is subjected to thermal pretreatment in order considerably to reduce its microbial content before drying. To this end, the pH of the aqueous medium or emulsion may be adjusted to approximately 2.5 to 3 or 9 by addition either of a food-grade acid or of a food-grade base, after which the aqueous medium or emulsion may be treated for 20 to 30 minutes at a temperature of, or below, 80° C. and preferably at a temperature of from 70° to 80° C. The heat-treated emulsion may then be neutralized to a pH of approximately 7 by addition either of a food-grade base or of a food-grade acid and then dried or, alternatively, the emulsion may be dried at the same pH at which it was heat-treated, neutralization then taking place during reconstitution in an aqueous medium before gelling.

Alternatively, the heat treatment may be carried out as before on a dispersion of the protein, for example, a retentate from the ultrafiltration of whey preferably having a dry matter content of approximately 7%, after which the dispersion may be concentrated and dried, if necessary after neutralization. In this case, emulsification takes place after reconstitution by dilution in an aqueous medium.

It has been found that the preceding heat treatment, whether applied to an emulsion or to a dispersion, does not significantly affect the gelling properties of the protein, which is particularly advantageous insofar as it provides an intermediate product of satisfactory wholesomeness and gelling power which may be used after storage.

The homogenized emulsion may be used in gelled culinary products as a partial or complete replacement for eggs, thickeners or gelling agents. For example, it may be used in egg custards, quickes, omelettes, pancakes or sausages. In cases such as these, the rest of the ingredients involved in the composition of the culinary products are added to the homogenized and, optionally, dried and reconstituted emulsion which is then subjected to the gelling heat treatment.

The process according to the invention has certain specific advantages:

it uses whey proteins and makes use of this by-product for human nutrition, it enables liquid oils, for example, oils rich in unsaturated fatty acids, to be incorporated in products of solid texture. The gels obtained have nutritional qualities of value in dietetics because they combine whey proteins of high nutritional value with dietetic oils rich in essential fatty acids, because oil-in-water emulsions are involved, there is no need for the delicate phase reversal process to obtain the consistency of spreadable creams, so that the creams themselves may be hypocaloric in relation to traditional products of comparable consistency, the gels obtained are hypocholesterolemic compared with egg-based products of similar texture.

The invention is illustrated by the following Examples in which the parts and percentages are by weight, unless otherwise indicated.

In the Examples, the diameters of the fat globules and their distribution were determined by scattering of laser light, for example in accordance with B. Berne and R. Pecora in "Dynamic Light Scattering with Applications in Chemistry, Biology and Physics", J. Wiley & Sons, New York 1976. From the light scattering data, frequency distribution curves are established and the diameters of the fat globules and the percentage of fat globules having a given diameter may be deduced therefrom. If the diameters are plotted as the abscissae and the percentages as the ordinates of a graph, a quantitative expression of the distribution of the fat globules in the emulsion is obtained. Thus, a homogeneous emulsion will be characterized by a curve having a single peak. A plurality of separate curves or a single multiple-peak curve will be characterized of a heterogeneous emulsion containing several series of globules. From a % cumulative distribution curve it is possible to deduce the extreme dimensions of the globules of one series and their mean diameter according to the following formula:

mean diameter $=(\epsilon X \cdot d\phi)/\epsilon d\phi$ in which

X is the mean diameter in nanometers of one series of globules within a given diameter range, $d\phi$ is the percentage of globules within the range in question.

The firmness of the gels was determined by measuring the mechanical force required to break the gel (rupture) or to compress it to a given degree (deformation) using an Instron texture analyzer, for example in accordance with M. C. Bourne in "Food Texture and Viscosity", Academic Press, New York and London, 1983, Chapter 3 and pp. 176–185. To carry out these measurements, the gels were cut into cylinders 30 mm long and 28 mm in diameter. The area of contact between the gel and the compression disc of the apparatus was 6.16 cm$^2$. The percentage deformation by an applied force of 0.98N (deformation) and the force required to rupture the gel (rupture) were determined.

EXAMPLE 1

An aqueous medium containing a concentrate of whey proteins (obtained by ultrafiltration of sweet whey and containing 81% of proteins, based on dry matter), pH 6.9, is mixed at 50° C. with grapeseed oil in the proportions indicated. Emulsification is obtained by five successive passes in a valve-type laboratory homogenizer comprising two stages each under a pressure of 18 MPa. Glass containers in rows of 4 are filled with the emulsions obtained and are then heated in a water bath for 30 minutes to 90° C. The containers are then immersed in ice and the products removed from the molds. The firmness of the gels is evaluated after standing for 1 hour (rupture). The results are shown in Table 1 below.

TABLE 1

| % oil (by volume/volume) | % Proteins (by weight/volume) | | | | |
|---|---|---|---|---|---|
| | 4 | 6 | 8 | 10 | 12 |
| 2.5 | 0 | 2 | 3 | 4 | 4 |
| 5 | 0 | 2 | 3 | 4 | 4 |
| 7.5 | 0 | 2 | 3 | 4 | 4 |
| 10 | 0 | 2 | 3 | 4 | 4 |
| 15 | 1 | 2 | 3 | 4 | 4 |
| 20 | 1 | 3 | 4 | 4 | — |
| 30 | 1–2 | 3 | 4 | 4 | — |
| 40 | 2 | 3 | 4 | — | — |

Legend:
0: gelling limit
1: very weak gel, firmness not measurable

Comparison Example

A mixture containing 7.5% weight/volume of whey proteins, the aqueous medium representing 85% and the lipidic medium 15% by volume of the mixture, is emulsified at 50° C.

I in a laboratory mixer for 2 minutes,
II in a colloid mill for 2 minutes,
III in the same valve-type homogenizer as before,
IV in one pass through a single-stage valve-type homogenizer.

The fat globules of the emulsions are analyzed. Gels are prepared in the same way as before and their firmness is analyzed. The results are set out in Table 2 below.

TABLE 2

| | Emulsification technique | | | |
|---|---|---|---|---|
| | I | II | III | IV |
| Number of series of fat globules | 2 (2 separate curves) | 2 (2 separate curves) | 1 | 2 (1 two-peak curve) |
| Diameters of the globules of the main | 650–8000 | 1000–8000 | 140–1800 | 370–8000 |

TABLE 2-continued

| | Emulsification technique | | | |
|---|---|---|---|---|
| | I | II | III | IV |
| series (nanometers, nm) | | | | |
| Mean diameter of the globules (nm) | 2400 | 2150 | 430 | 1340 |
| % globules of diameter: | | | | |
| <3000 nm | 80 | 70 | — | 64 |
| <2000 nm | 27 | 25 | 100 | 40 |
| <1000 nm | 10 | 5 | 84 | 9 |
| gelling | no | no | yes | no |

—: not determined

Despite the identical compositions, only emulsion III contains a single series of globules. Its homogeneity is excellent, the mean diameter of the globules is small and the diameter distribution is narrow. It is the only gellable emulsion which produces a firm gel.

The other emulsions show several series, a large mean diameter of the globules and a very broad distribution of the diameters. Emulsions I and II remain entirely liquid while emulsion IV shows only incipient gelling.

EXAMPLE 2

An emulsion containing 7.5% by weight/volume of whey proteins, 85% by volume of aqueous medium and 15% by volume of grapeseed oil is prepared under the same conditions as in Example 1, except that the number of passes through the homogenizer is varied. The properties of the emulsions and the gels obtained under the same conditions as in Example 1 are shown in Table 3 below.

TABLE 3

| | Number of passes | | | | | |
|---|---|---|---|---|---|---|
| | 1 | 3 | 6 | 10 | 15 | 20 |
| Properties of the emulsions | | | | | | |
| Number of series of globules | 2 | 1 | 1 | 1 | 1 | 1 |
| Mean diameter of the globules (nm) | 2164 | 651 | 580 | 475 | 396 | 389 |
| % globules of diameter >1000 nm | 88 | 55 | 40 | 18 | 7 | 6 |
| Properties of the gels | | | | | | |
| Appearance | very soft | firm | firm | very firm | very firm | very firm |
| Deformation by 1 force of 0.98 N (%) | 23 | 12.5 | 11 | 9.8 | 9.7 | 8.7 |
| Compressive force causing a rupture (N/cm$^2$) | 0.35 | 1.79 | 2 | 2.23 | 2.21 | 2.27 |

The above results show that the emulsion becomes homogeneous and finer after 3 passes. Correlatively, the gel obtained is only firm where homogenization is intensive.

EXAMPLE 3

An emulsion containing 8.4% by weight/volume of whey proteins as concentrate is prepared at 50° C./pH 7 with various lipidic media in the proportions indicated below using the homogenizer of Example 1 and the same pressure conditions in each of the two stages, but in 4 passes.

The properties of the gels obtained under the same conditions as in Example 1 are shown in Table 4 below (values obtained by averaging the values of a series of 4 gels).

TABLE 4

| | | Properties of the gels | |
|---|---|---|---|
| Type of oil and % in the emulsion (by volume) | | Deformation by 1 force of 0.98 N (%) | Compressive force causing a rupture (N/cm$^2$) |
| Olive oil | 10 | 26.3 | 0.23 |
| | 15 | 15 | 0.84 |
| | 20 | 9.1 | 1.74 |
| Grapeseed oil | 10 | 24.2 | 0.39 |
| | 15 | 19.1 | 1.61 |
| | 20 | 8.8 | 1.83 |
| Peanut oil | 10 | 24.2 | 0.55 |
| | 15 | 16 | 1.28 |
| | 20 | 9.8 | 2.87 |
| Safflower oil | 10 | 24.6 | 0.42 |
| | 15 | 13.5 | 1.95 |
| | 20 | 7.3 | 3.91 |

EXAMPLE 4

A liquid concentrate obtained by ultrafiltration of sweet whey emanating from the production of gruyere containing (in percent, based on dry matter) 83.9% proteins, 5% lipids and 3.3% ash, including 0.68% calcium (the balance to 100% being lactose) is treated by diafiltration against 6 times its volume of 0.05M aqueous sodium citrate buffer solution at pH 3.2 and at a temperature of 5° to 8° C.

The retentate obtained contains (in percent, based on dry matter) 80.4% proteins, 0.09% calcium and 5.42% citrate, that is to say contains only 12% of the initial calcium and that the molar ratio of citrate to calcium is 13:1 as against 0.14:1 in the non-diafiltered whey concentrate.

An emulsion containing 4% by weight/volume of proteins and 1 mM of calcium is prepared from the diafiltered retentate at pH 7 using grapeseed oil under the same homogenization conditions as in Example 3.

The properties of the gels obtained under the same conditions as in Example 1 are set out in Table 5 below (average values of 4 gels)

TABLE 5

| | Properties of the gels | |
|---|---|---|
| % oil in the emulsion (by volume) | Deformation by 1 force of 0.98 N (%) | Compressive force causing a rupture (N/cm$^2$) |
| 10 | 33 | 1.83 |
| 15 | 10.2 | 3.21 |

The above results show that the emulsions gel very well despite a low concentration of calcium and a 13-fold molar excess of citrate over calcium in the aqueous medium (which means that all the residual calcium has to be chelated by the citrate so that it is not available for reaction with the protein).

It would seem that the calcium ions do not have any real bearing on the gelling process.

EXAMPLE 5

2.4 kg of concentrate of whey proteins, pH 6.9, are dispersed in 31.6 kg of water and 6 l of corn oil are added with stirring to the resulting dispersion. After adjustment of the volume to 40 liters by addition of water, the dispersion is heated to 50° C. and passed through a colloid mill. Except for a small part (for comparison), the pre-emulsion obtained is then treated under different homogenization conditions (see Table 6 below) at 50° C. in a Manton-Gaulin industrial homogenizer, after which the fat globules in the emulsions are analyzed in the same way as before.

Five metal cans are each filled with 150 g of emulsion, one being filled with the non-homogenized pre-emulsion (for comparison). The cans are hermetically sealed and placed in an autoclave at 100° C. for 30 minutes. After cooling in an ice bath, the cans are opened and the gels are analyzed in the same way as before using the Instron apparatus.

The homogenization conditions and the results of the analyses are shown in Table 6 below.

It can be seen that the finest and the most homogeneous emulsion (1 stage, 30 MPa) produces the firmest gel whereas no gel is obtained without homogenization.

NaOH solution and 7 ml of a 2N HCl solution, respectively, and subsequently dried by freeze-drying.

With these two heat-treated and dried protein concentrates, two emulsions are prepared under the same conditions as in Example 1 and of the same type as in Example 2.

The properties of the gels obtained are indicated in Table 7 below.

TABLE 7

|  | Deformation by 1 force of 0.98 N (%) | Compressive force causing a rupture (N/cm$^2$) |
| --- | --- | --- |
| Gel with a concentrate heat-treated at pH 3 | 14.4 | 1.31 |
| Gel with a concentrate heat-treated at pH 9 | 18.1 | 1.27 |

It can be seen that the gels are firm and that, accordingly, the heat treatment of the retentates under the conditions indicated does not affect the gelling properties of the proteins.

EXAMPLE 7

1 l of an emulsion containing 6% by weight/volume of whey proteins, 85% by volume of aqueous medium and 15% by volume of oil is prepared under the same conditions as in Example 1, except that the aqueous phase is acidified to pH 3 with 16 ml of a 2N HCl solu-

TABLE 6

|  | Homogenization conditions | | | |
| --- | --- | --- | --- | --- |
|  | Without homogenization (comparison) | 1 stage 20 MPa | 1 stage 30 MPa | 2 stages 15 MPa then 5 MPa | 2 stages 15 MPa then 15 MPa |
| Properties of the emulsions | | | | | |
| Number of series | — | 1 | 1 | 1 | 1 |
| Mean diameter of the globules (nm) | — | 866 | 662 | 1069 | 756 |
| Dimensions of the globules (nm) | — | 168–4072 | 142–2890 | 168–5349 | 142–3295 |
| % globules of diameter: | | | | | |
| ≦ 1000 nm |  | 71 | 86 | 61 | 79 |
| ≦ 2000 nm |  | 92 | 99 | 89 | 99 |
| Properties of the gels (average value of 5 gels) | | | | | |
| Appearance | no gelling | firm gel | firm gel | soft gel | firm gel |
| Deformation by 1 force of 0.98 N (%) |  | 28.9 | 23 | 36.1 | 28.7 |
| Compressive force causing a rupture (N/cm$^2$) |  | 1 | 1.2 | 0.65 | 1.15 |

—: not determined

EXAMPLE 6

1 l of retentate from the ultrafiltration of whey containing 14% dry matter and 80% proteins, based on dry matter, is dispersed in water at pH 6.9 to a volume of 2 l.

1 l of this dispersion is acidified to pH 3 with 37 ml of a 2N HCl solution, the other liter being adjusted to pH 9 with 7 ml of a 2N NaOH solution.

In order to reduce the number of viable germs, the two preparations are heat-treated for 20 minutes at 75° C. They are then neutralized to pH 7 with 37 ml of a 2N tion before homogenization.

In order to reduce the number of viable germs, the emulsion is heat-treated for 30 minutes at 80° C. and then neutralized to pH 7 with 15 ml of a 2N NaOH solution. Gels are formed as described in Example 1 and their properties evaluated. The results are shown below.

Deformation by 1 force of 0.98N (%): 21.8; Compressive force causing a rupture (N/cm$^2$): 0.56.

It can be seen that the heat treatment of the emulsion under the conditions indicated does not affect the gelling properties of the proteins.

EXAMPLE 8

Preparation of Omelettes or Pancakes

An aqueous medium is prepared by dispersing 1 kg of whey protein concentrate containing 80% proteins in 7 l of water containing 200 g of sodium chloride. The pH of the dispersion is adjusted to 7 by addition of sodium hydroxide and the volume is made up to 8.5 l with water. To the aqueous medium preheated to 55° C. are then added with mixing 1.46 kg of a lipidic medium heated to 53° C. containing 80% by volume of peanut oil and 20% by volume of sunflower oil. The mixture is then passed through a colloid mill and homogenized in an industrial Manton-Gaulin homogenizer comprising a single stage under a pressure of 20 MPa.

The homogenized emulsion is then spray-dried, giving a powder having the following composition:

|  | % |
| --- | --- |
| proteins | 31 |
| total lipids | 52.9 |
| ash | 9.5 |
| lactose | 3 |
| moisture | 3.6 |

25 g of the dried emulsion and 40 g of wheat flour are dispersed in 50 ml of water the resulting dispersion is poured with stirring into 150 ml of skimmed milk and spices are added.

Cooking in a frying pan for about 5 minutes at around 200° C. gives omelettes or pancakes of excellent consistency which have a neutral taste and are white in color compared with an omelette or pancake made from eggs.

COMPARISON EXAMPLE

For comparison, pancakes are made in the traditional way (A) and as described above (B) from ingredients in the proportions indicated in Table 8 below:

TABLE 8

| Ingredients % | A | B |
| --- | --- | --- |
| Wheat flour | 30 | 30 |
| Whole liquid eggs | 50 | — |
| Dried emulsion | — | 15 |
| Skimmed milk | 20 | 55 |

The pancakes thus prepared have the following percentage cholesterol contents and caloric values:

|  | A | B |
| --- | --- | --- |
| Cholesterol % | 0.25 | 0.005 |
| Caloric value per 100 g |  |  |
| Kilojoules (KJ) | 821 | 1001 |
| Kilocalories (Kcal) | 196.3 | 239.2 |

It can be seen that the gelled food prepared in accordance with the invention (B) may be hypercaloric while having a negligible cholesterol content compared with the traditional product made from eggs (A).

EXAMPLE 9

Preparation of Desserts or Jellies 1 kg of whey protein concentrate containing 80% proteins is dispersed in 8 l of water containing 0.3 kg raspberry syrup. The weight of the aqueous medium is adjusted to 10 kg by addition of water and its pH to 7.5 by addition of sodium hydroxide. 2 kg of butter melted beforehand at 50° C. are then mixed with the aqueous medium, followed by homogenization as in Example 8. The homogenizate is then poured into 50 ml metal cans, after which the cans are hermetically sealed and placed in an autoclave for 20 minutes at 110° C.

After cooling, the cans are opened and a bright gel is removed. This gel is a dessert which can be eaten with a spoon, which has an agreeable taste and which produces a pleasant mouthfeel.

EXAMPLE 10

Preparation of Low-fat Spreadable Creams 750 g of a whey protein concentrate containing 80% proteins are dispersed in 8 l of water. 60 g of sodium chloride and 10 g of potassium sorbate are added to the resulting dispersion, after which the pH of the aqueous medium is adjusted to 3.3 with citric acid and its weight to 10 kg with water. 70 volumes of the aqueous medium are then mixed while stirring with 30 volumes of a lipidic medium containing 50% by volume of corn oil, 25% by volume of soya oil and 25% by volume of sunflower oil, the two media having been preheated to 50° C.

The mixture is then homogenized in a Manton-Gaulin industrial homogenizer comprising two stages, the first at 20 MPa and the second at 10 MPa. The emulsion is then poured into 100 ml plastic trays which are hermetically sealed and placed in an autoclave for 30 minutes at 100° C.

When the trays are opened after cooling, they are found to contain a bright creamy gel which has a smooth texture and which is easy to spread with a knife. The cream causes an agreeable mouthfeel. It contains 30 g of lipids.

COMPARISON EXAMPLE

A spreadable cream (B) is prepared in the same way as above, but from 25% by volume of lipidic medium and 75% by volume of aqueous medium. For comparison, a traditional spreadable cream of comparable consistency (A) is prepared in the form of a water-in-oil emulsion from the same ingredients. The composition of the products and their caloric value are shown in Table 9 below.

TABLE 9

| Composition % | A | B |
| --- | --- | --- |
| Fats | 40 | 25 |
| Proteins | 2 | 4.5 |
| Water | 58 | 70.5 |
| Caloric value per 100 g |  |  |
| KJ | 1590 | 1050 |
| Kcal | 380 | 251 |

The spreadable cream prepared in accordance with the invention (B) is low in calories by comparison with the traditional product (A) in which it is very difficult to reduce the concentration of fats without reversing the emulsion.

EXAMPLE 11

Preparation of Egg Custards

An oil-in-water emulsion is prepared from 80 parts of an aqueous medium containing 9.6% whey protein concentrate containing 83.3% proteins and 20 parts of butter melted beforehand at 50° C., after which the emulsion is homogenized as in Example 8.

The homogenizate is intended to replace part of the eggs in a traditional egg custard recipe (comparison).

To prepare the egg custards, the homogenizate is mixed with milk, whole eggs separately homogenized beforehand and sugar, the resulting mixture is poured into pots and the pots thus filled are hermetically sealed and placed in an autoclave for 45 minutes at 95° C.

The proportions of the ingredients and the texture characteristics of the egg custards obtained are shown in Table 10 below.

TABLE 10

| % replacement of egg by homogenizate | Whole milk | Eggs | Sugar | Homogenizate | Texture |
|---|---|---|---|---|---|
| 0 (comparison) | 65 | 25 | 10 | — | smooth, medium firmness |
| 50 | 57.5 | 12.5 | 10 | 20 | smooth, less firm than comparison |
| 50 | 47.5 | 12.5 | 10 | 30 | equivalent to comparison |
| 75 | 47.5 | 6.25 | 10 | 30 | smooth, less firm than comparison |
| 75 | 37.5 | 6.25 | 10 | 40 | equivalent to comparison |

All the egg custards obtained have a pleasant supple and smooth texture. In the whole eggs are not homogenized before mixing with the other ingredients, the egg custards obtained have a supple and smooth texture and contain numerous bubbles. Similar results are obtained by mixing a homogenizate previously dried as in Example 8 with the other ingredients.

EXAMPLE 12

Preparation of Quiches

An oil-in-water emulsion is prepared from 83 parts of an aqueous medium containing 6.5% of whey proteins and 17 parts of peanut oil or butter melted beforehand, the emulsion thus prepared is homogenized and the homogenizate is optionally dried as in Example 8. The homogenizate is intended to replace the eggs in a traditional quiche recipe used for comparison.

To prepare the base for traditional quiches, whole eggs, fresh cream, milk and corn starch are mixed in the proportions indicated in Table 11 below.

The base is then placed in a mold lined with pastry and the quiches are cooked in an oven for 35 minutes at 230° C.

TABLE 11

| | Ingredients % | | | | |
|---|---|---|---|---|---|
| Sample | Homogenizate | Eggs | Cream | Whole or semi-skimmed milk | Corn starch |
| Comparison | — | 72 | 6 | 15 | 7 |
| I | 18 | 54 | 6 | 15 | 7 |
| II | 36 | 36 | 6 | 15 | 7 |
| III | 54 | 18 | 6 | 15 | 7 |
| IV | 72 | — | 6 | 15 | 7 |
| V | 36 | 36 | — | — | — |
| VI | 54 | 18 | — | — | — |

The samples are fairly similar to one another. Their hardness decreases with the amount of egg used although their texture is totally acceptable. Sample IV does not rise as much as the other samples in the oven.

Good results are also obtained using only the dried homogenizate, of which the lipidic medium is butter, reconstituted with water or milk to 20% dry matter.

EXAMPLE 13

Preparation of Sausages

An oil-in-water emulsion is prepared from 83 parts of an aqueous medium containing 6.5% whey proteins and 17 parts of molten beef tallow, after which the emulsion thus prepared is homogenized in the same way as in Example 8.

The following ingredients are ground and mixed in the proportions indicated in a cutter:

| | % |
|---|---|
| lean beef | 19 |
| fatty pork | 13 |
| lard | 11 |
| lean pork | 19 |
| crushed ice | 19 |
| spices | 4 |
| homogenizate | 15 |

Casings are then filled with the ground mixture, after which the casings thus filled are sealed and cooked for 40 minutes at 85° C. The sausages obtained are comparable with traditional sausages prepared from a fatty emulsion obtained by mixing liquid beef fat, caseinate and water instead of the homogenizate.

We claim:

1. A process for preparing gelled food products comprising:
    (a) combining and homogenizing an aqueous medium containing gellable whey proteins with a lipidic medium such that an emulsion is formed which contains 4% to 12% by weight/volume of the gellable whey proteins and from 2.5% to 40% by volume of the lipidic medium and which contains a homogeneous series of lipidic globules having diameters of from 140 to 6000 nanometers and a mean diameter of less than 1000 nanometers;

(b) heat-treating the emulsion at a pH of from 3.5 to 8 at from 80° C. to 250° C. for from 5 to 90 minutes.

2. A process as claimed in claim 1 wherein the gellable whey proteins contain from 50 to 95% by weight proteins, based on dry matter.

3. A process as claimed in claim 1 wherein homogenization is carried out under a pressure of at least 15 MPa.

4. A process as claimed in claim 1 or 3 wherein the homogenization is carried out at from 40° C. to 60° C.

5. A process as claimed in claim 1 wherein the mean diameter of the lipidic globules is from 350 to 800 nanometers.

6. A process as claimed in claim 1 wherein the pH of the aqueous medium is adjusted to be within the range of from 3.5 to 8 prior to combining it with the lipidic medium.

7. A process as claimed in claim 1 wherein the pH of the emulsion is adjusted to be within the range of from 3.5 to 8 prior to heat-treating it.

8. A process as claimed in claim 1 further comprising drying the emulsion, while avoiding gelling, after forming the emulsion and prior to heat-treating it and subsequently reconstituting the dried emulsion and then heat-treating the reconstituted emulsion.

9. A process as claimed in claim 8 further comprising heating the aqueous medium, prior to combining it with the lipidic medium, or heating the emulsion, prior to drying the emulsion, at a pH less than 3.5 at a temperature at or below 80° C.

10. A process as claimed in claim 9 wherein the aqueous medium or emulsion which is heated is at a pH of from 2.5 to 3.

11. A process as claimed in claim 8 further comprising heating the aqueous medium, prior to combining it with the lipidic medium, or heating the emulsion, prior to drying the emulsion, at a pH greater than 8 at a temperature at or below 80° C.

12. A process as claimed in claim 11 wherein the aqueous medium or emulsion which is heated is at a pH of about 9.

13. A process as claimed in claim 9 or 11 further comprising neutralizing the pH of the emulsion to a pH of about 7 prior to drying the emulsion.

14. A process as claimed in claim 9 or 11 wherein the aqueous medium or the emulsion is heated for 20 to 30 minutes at a temperature of from 70° C. to below 80° C.

15. A process as claimed in claim 1 further comprising first preparing a dispersion of the gellable whey proteins, heating the dispersion at a temperature at or below 80° C., drying the dispersion, subsequently reconstituting the dried dispersion in an aqueous medium and combining, homogenizing and heat-treating the reconstituted dispersion with the lipidic medium.

16. A process as claimed in claim 1 further comprising adding flavorants and ingredients to the emulsion for foods selected from the group of foods consisting of creams, mayonnaise, salad dressings, omelettes, pancakes, quiches, custards and jellies prior to heat-treating the emulsion.

17. The product obtained by the process claimed in claim 1 or 2 or 3.

18. A gelled food composition comprising an emulsion of from 4 to 8% by weight/volume of gelled whey proteins and from 20 to 40% by volume of lipids having a protein to lipid ratio by weight/volume of from 0.1:1 to 0.4:1 and a pH of from 3.5 to 4.5 and having a homogeneous series of lipidic globules having diameters of from 140 to 6000 nanometers and a mean diameter of less than 1000 nanometers.

19. A gelled food composition comprising an emulsion of from 5 to 8.5% by weight/volume of gelled whey proteins and from 10 to 20% by volume of lipids having a protein to lipid ratio by weight/volume of from 0.25:1 to 0.85:1 and a pH of from 4.5 to 8 and having a homogeneous series of lipidic globules having diameters of from 140 to 6000 nanometers and a mean diameter of less than 1000 nanometers.

20. A composition as claimed in claim 18 or 19 wherein the mean diameter of the lipidic globules is from 350 to 800 nanometers.

21. A composition as claimed in claim 18 or 19 wherein the lipidic medium is selected from the group consisting of lipids of vegetable origin, of lactic origin and of animal origin which are liquid at 40° C. to 60° C. and combinations thereof.

22. A composition as claimed in claim 18 or 19 wherein the lipidic medium is selected from the group of vegetable oils which are liquid at 40° C. to 60° C., cream, butter, butter oil, butter oil fractions, lard, beef tallow, egg yolk and combinations thereof.

23. A composition as claimed in claim 18 wherein the food is selected from the group consisting of creams, mayonnaise and salad dressings.

24. A composition as claimed in claim 19 further comprising flavorants and ingredients for preparation of foods selected from the group consisting of omelettes, pancakes, quiches, custards and jelly.

* * * * *

UNITED STATES PATENT AND TRADEMARK OFFICE
CERTIFICATE OF CORRECTION

PATENT NO. : 4,720,390

DATED : January 19, 1988

INVENTOR(S) : Robert Bachler, et al.

It is certified that error appears in the above-identified patent and that said Letters Patent is hereby corrected as shown below:

Column 5, line 6, "quickes" should be -- quiches --.

Column 5, line 47, "characterized" should be -- characteristic --.

Column 6, at line 46, after "1: very weak gel, firmness not measurable" and before "Comparison Examples" insert:

-- 2: weak, self-supporting gel, firmness ¼ 0.5 N/cm$^2$
3: medium gel, firmness to 1 N/cm$^2$
4: strong gel, firmness ½ 1 N/cm$^2$
-: not determined --.

Column 11, line 11, "53°C." should be -- 55°C. --.

Signed and Sealed this

Twelfth Day of July, 1988

*Attest:*

DONALD J. QUIGG

*Attesting Officer*  *Commissioner of Patents and Trademarks*